United States Patent [19]

Luddy et al.

[11] 4,205,006

[45] May 27, 1980

[54] PHYSIOCHEMICALLY DESIGNED FAT COMPOSITIONS FROM TALLOW AND PROCESS FOR MAKING

[75] Inventors: Francis E. Luddy, Hatboro; James W. Hampson; Samuel F. Herb, both of Philadelphia; Herbert L. Rothbart, Flourtown, all of Pa.

[73] Assignee: The United States of America as represented by the Secretary of Agriculture, Washington, D.C.

[21] Appl. No.: 891,956

[22] Filed: Mar. 31, 1978

Related U.S. Application Data

[62] Division of Ser. No. 825,742, Aug. 18, 1977, Pat. No. 4,130,572, which is a division of Ser. No. 642,837, Dec. 22, 1975, Pat. No. 4,049,839, which is a division of Ser. No. 337,789, Mar. 5, 1973, Pat. No. 3,944,585.

[51] Int. Cl.² .............................................. A23D 5/00

[52] U.S. Cl. ................................ 260/410.7; 426/607; 426/608

[58] Field of Search ............................... 426/607, 608; 260/428.5, 410.7

[56] References Cited

U.S. PATENT DOCUMENTS

| | | | |
|---|---|---|---|
| 2,740,799 | 4/1956 | Young et al. | 260/428.5 X |
| 3,944,585 | 3/1976 | Luddy et al. | 426/608 X |
| 4,049,839 | 9/1977 | Luddy et al. | 426/608 X |

FOREIGN PATENT DOCUMENTS

| | | | |
|---|---|---|---|
| 38-918 | 2/1963 | Japan | 260/428.5 |

OTHER PUBLICATIONS

Anderson et al., Margarine 1965, Pergamon Press, New York, pp. 29–31.
Oil and Soap, 23, 276–283, 1946.
J.A.O.C.S., 30, 186–190–1953.

*Primary Examiner*—Joseph M. Golian
*Attorney, Agent, or Firm*—M. Howard Silverstein; William E. Scott; David G. McConnell

[57] ABSTRACT

Beef tallow is partitioned into five well defined fractions, each having its own distinctive fatty acid and glyceride composition and its own distinctive thermal characteristics, by a precise multi-step crystallization. Two of the five fractions are crystalline, one is a plastic solid and two are liquid. One of the liquid fractions accounts for 60% of the tallow and has a variety of uses in the formulation of salad oils, margarines and liquid and plastic shortenings. The composition and properties of the plastic solid fraction are very similar to those of cocoa butter and when it is mixed with cocoa butter it does not produce any significant change in thermal characteristics. In fact, an increment of one of the crystalline fractions or of one of the liquid fractions can be blended with an increment of the solid plastic fraction to make products that are compatible with cocoa butter and that have desirable thermal characteristics. However, when an increment of the other crystalline fraction is blended with an increment of the solid plastic fraction, the resulting product has undesirable thermal characteristics.

1 Claim, 16 Drawing Figures

PHYSIOCHEMICALLY DESIGNED FAT COMPOSITIONS FROM TALLOW AND PROCESS FOR MAKING

A non-exclusive, irrevocable, royalty-free license in the invention herein described, throughout the world for all purposes of the United States Government, with the power to grant sublicenses for such purposes, is hereby granted to the Government of the United States of America.

This is a division of application Ser. No. 825,742, filed Aug. 18, 1977, now U.S. Pat. No. 4,130,572, which is a division of application Ser. No. 642,837, filed Dec. 22, 1975, now U.S. Pat. No. 4,049,839, which is a division of application Ser. No. 337,789, filed Mar. 5, 1973, now U.S. Pat. No. 3,944,585.

Beef tallow is a complex material consisting predominently of esters of glycerol and fatty acids. The majority of the fatty acids have from 14 to 18 carbons in their chain length and are both saturated and unsaturated. For the purposes of this invention a typical beef tallow has the following fatty acid composition:

| Acid | Percent |
|---|---|
| hexadecanoic | 26 |
| hexadecenoic | 5 |
| octadecanoic | 15 |
| octadecenoic | 44 |

The remaining 10% of the beef tallow fatty acids occur in minor concentrations.

The physical characteristics of tallow or of tallow fractions depend not only on the component fatty acids but also on the manner in which these acids are distributed on the glyceride molecule. The number of component glycerides is very large since only five fatty acids can theoretically produce 125 triglycerides, including all position isomers. To simplify the problem of composition, fats are frequency described in percentages of fatty acids and types of closely related glycerides. By designating the saturated and unsaturated acyl groups as S and U, respectively, the following six triglyceride types can be formulated depending on the number and position of saturated and unsaturated groups in each:

| Glyceride Types | | | | | |
|---|---|---|---|---|---|
| 1 | 2 | 3 | 4 | 5 | 6 |
| S | S | S | S | U | U |
| S | S | U | U | S | U |
| S | U | S | U | U | U |

Beef tallow contains a great number of glycerides which exhibit a variety of physical properties. Some are solid or semi-solid at room temperature while others are liquid. Combined in their natural state they make tallow a material with very limited uses.

Consequently, it is an object of this invention to prepare from tallow, glyceride mixtures having predetermined physical characteristics thus increasing the usefulness of tallow and making it the source of a variety of tailor-made fats with specific utilities.

Another object of this invention is to prepare from beef tallow, specific glyceride mixtures, each with its own distinctive thermal characteristics and its own specific utility.

Still another object of this invention is to prepare from tallow, specific glyceride mixtures, each with its own distinctive glyceride composition.

A further object of this invention is to prepare from tallow, specific glyceride mixtures that can be made into or added to a variety of food products.

In general, according to the present invention, beef tallow is partitioned into five well defined fractions, each having its own distinctive fatty acid and glyceride composition and its own distinctive thermal characteristics, by a precise multi-step crystallization. Although acetone is the preferred solvent, other solvent such as petroluem ether, methyl ethyl ketone or methyl isobutyl ketone may be used. Two of the five fractions are crystalline, one is a plastic solid and two are liquid.

Figure 1A:
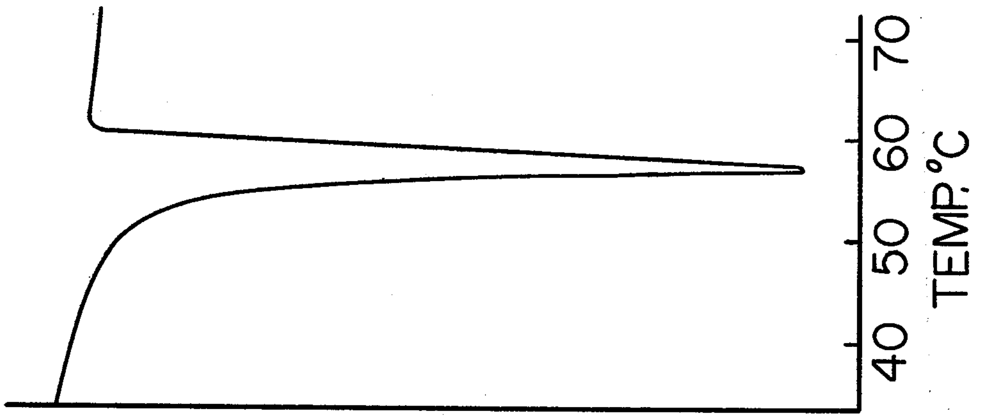
FIG. 1A, 2A, and 3A represent DSC thermal profiles of various fat fractions.

Heretofore, the physical and chemical characteristics of these five fractions would have been described by their melting point, solid-fat index and iodine values. These classical analytical values yield little specific information on the complex chemical nature of the component glycerides or the multi-crystalline behavior they exhibit. In order to prepare glyceride mixtures having specific physical characteristics and to describe each mixture in terms that are meaningful relative to its chemical composition and physical behavior, we used modern and sophisticated techniques of thermal analysis and gas liquid chromatography (GLC).

Thermal energy is absorbed or evolved during a physical or chemical change in a sample. Differential scanning calorimetry (DSC) is an application of thermal analysis in which these physical or chemical changes are measured directly in energy units. From the thermal profile, the relative purity of a crystalline compound as well as the melting point, the heat of fusion, the specific heat and in the case of fatty materials, the polymorphic form or forms can be determined. Glycerides in common with almost all long chain compounds exhibit the phenomenon of polymorphism or the ability to exist in more than one crystal form. Polymorphism is more easily observed in natural fats when they are relatively simple in composition and consist of a few predominating glycerides. Glycerides can exist in at least 3 or more polymorphic forms. The Beta is the highest melting and most stable form, Beta prime is intermediate and Alpha is the lowest melting form of the crystalline fat.

An understanding of polymorphic change is essential for the satisfactory blending and tempering of those fats which must maintain a certain physical appearance during preparation and storage. The polymorphic form of the triglycerides determines the consistency, plasticity, graininess and other physical properties. Cocoa butter is an outstanding example of a strongly polymorphic fat. It is readily temperable to a stable Beta crystalline form, and fat fractions suitable as a replacement for cocoa butter must have similar thermal characteristics.

Gas liquid chromatography is a powerful tool for the separation of many complex mixtures. Fatty acids and similar compounds have long been analyzed by GLC, but it is only in recent times that columns and techniques have been available to analyze the high molecular weight triglycerides. With this tool, we have been able to characterize beef tallow and other fats including tallow fractions and cocoa butter in exact terms of the carbon number of the component triglycerides. The GLC curve of the component glycerides is characteristic of the composition and the composition is more readily obtained this way than by the previous procedure of separating glyceride classes.

In effect, using these powerful techniques we have obtained for each fraction or product a thermal profile which defines the thermal characteristics of the fraction and a composition profile which defines the component glycerides.

This invention differs from other solvent crystallization processes because it was specifically designed to prepare from beef tallow specific individual glyceride mixtures, each having its own distinctive thermal characteristics and its own distinctive glyceride composition. The novelty and the advantages of this invention over known fractionation and crystallization procedures are easily demonstrated by a direct comparision with other well-known prior art processes for fractionating and crystallizing beef tallow. For example, when the processes described in Examples 2 and 4 of U.S. Pat. No. 2,975,062 were scrupulously followed, the products or fractions obtained had completely different glyceride compositions and DSC thermal profiles than those of the products of the present invention. Thus, the products were entirely different than those of this invention and were totally unsuited to our objectives. In addition, this invention utilizes all of the tallow in preparing useful products based on glyceride composition and thermal profile.

The effectiveness of the process of this invention and the characteristics of the fractions obtained are shown in Tables I and II.

Thus, from the multitude of glycerides of beef tallow of the saturated-unsaturated acid combinations previously described, that is, types 1,2,3,4,5 and 6, specific glycerides are segregated according to their behavior pattern in solvents such as acetone at various temperatures. These fractions have a physical nature far different than that of the original tallow but they are still complex mixtures of glycerides. In describing these fractions according to a major glyceride type, it is not intended to imply that only this type of glyceride is present to the exclusion of all others in the fraction. On the contrary, the fraction composition illustrated by the major glyceride type (Table I) includes minor amounts of at least one additional type of glyceride. The glyceride composition of the fractions will be more specifically expressed later by our unique GLC profile of the fractions. From these profiles, the relationship of the component fatty acids as glycerides is conveniently expressed and quantitated.

The fatty acid composition of the five fractions is listed in Table II. The major saturated fatty acids, tetradecanoic ($C_{14}$), hexadecanoic ($C_{16}$), and octadecanoic ($C_{18}$) are the S portion of glyceride types 1,2,3,4 and 5; while the unsaturated acids, hexadecenoic ($C_{16:1}$) and octadecanoic ($C_{18:1}$) are the U portion of the glyceride types 2,3,4,5 and 6.

The glyceride composition of each of the five fractions described with reference to the number of carbon atoms in the fatty acid portion of the glyceride is shown in Table III.

Thermal profiles of each fraction as well as of cocoa butter and mixtures of both were obtained under similar conditions in a differential scanning calorimeter. Approximately 10 mg. of sample was used for each profile, the output signal from the instrument to the recorder was attenuated 16×, the heating rate was 10° C. per minute, the chart speed of the recorder was one inch per minute and the atmosphere around the sample was purged at the rate of 13 ml. per minute. Prior to running the thermal profile, each sample was cooled in the instrument to −15° C. after which it was heated and the profile recorded. That portion of the profile where melting took place is shown in the figures associated with each of the fractions and mixtures.

Figure 1B:
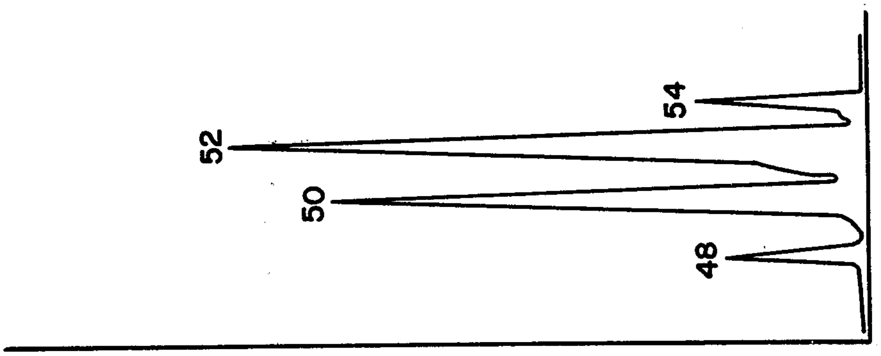
FIGS. 1B, 2B, and 3B represent GLC profiles of various fat fractions.

Fraction 1 of this invention is a high melting crystalline solid which is essentially trisaturated glycerides with a minor amount of disaturated monounsaturated glycerides. The DSC thermal profile and the GLC composition profile of this fraction are shown in FIGS. 1A and 1B, respectively.

Fraction 1 as shown by its thermal curve is a sharp, high melting product. It softens at about 40° C., starts melting rapidly at about 50° C. and is completely melted at about 57° C. This fraction can be used to harden shortenings and margarine stock in place of hydrogenated oils. Not only is the hydrogenation step eliminated but the product is free of oleic acid isomers common to partially hydrogenated oils. It can also be blended with liquid oils with or without catalytic rearrangement to formulate specialty shortenings. Its high ratio of stearic acid makes it valuable for many nonfood uses including cosmetic bases, pharmaceuticals, soaps and as a commercial source of stearic and palmitic acids.

Figure 2A:
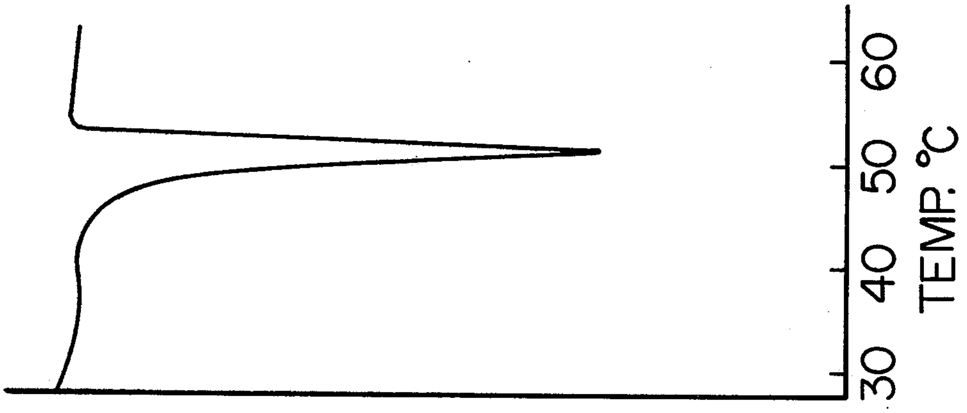
Figure 2B:
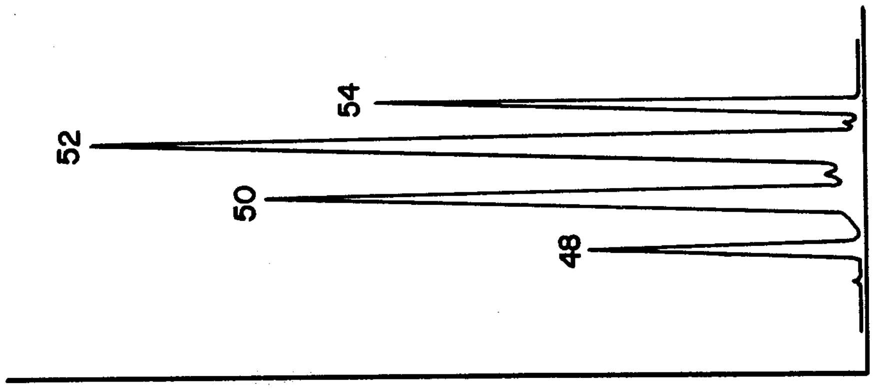

Fraction 2 is also a crystalline solid and is similar to Fraction 1 in many ways. Its thermal and GLC profiles are shown in FIG. 2A and 2B, respectively. It softens and starts melting at about 42° C. and is completely melted at 51° C. Fraction 2 is also composed mainly of trisaturated glycerides and a minor amount of disaturated monounsaturated glycerides but it is slightly lower melting than Fraction 1 and can be utilized in much the same way. A unique use of this fraction in conjunction with Fraction 3 will be discussed later.

The solid glycerides, Fractions 1 and 2, are useful in any application where high melting glycerides are needed. Their resemblance to hydrogenated stearines in melting characteristics makes them useful as hardening fats in shortening and margerine formulations where they can be used to control plasticity and to increase the plastic range without the expense of hydrogenation.

Figure 3A:
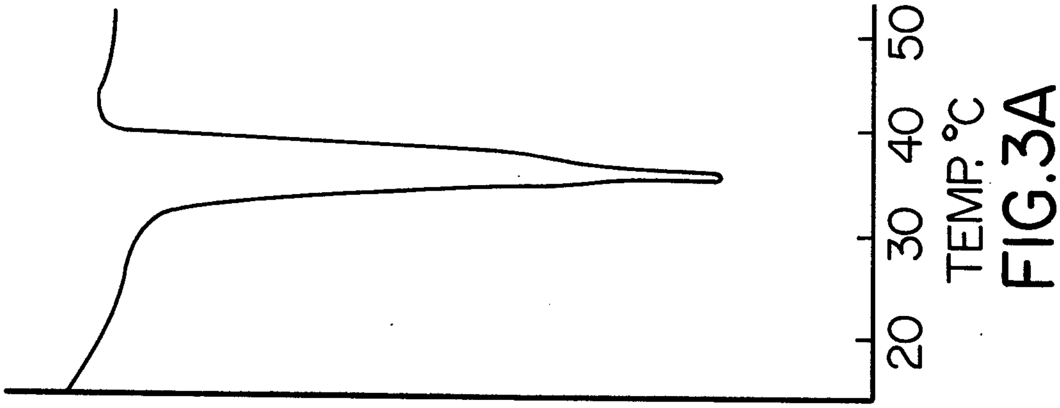
Figure 3B:
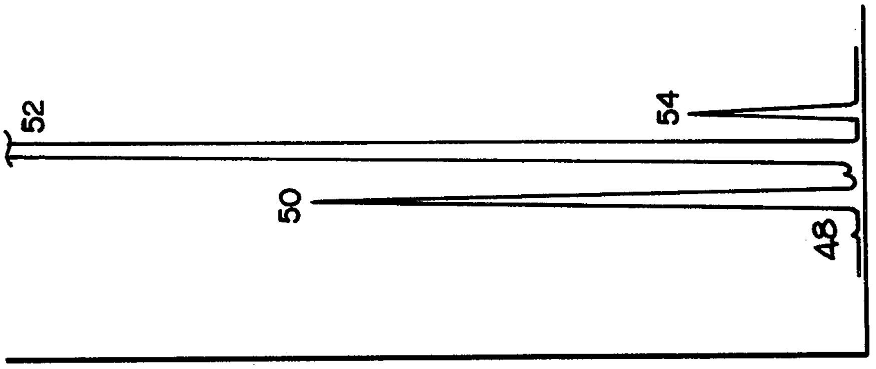
Figure 4:
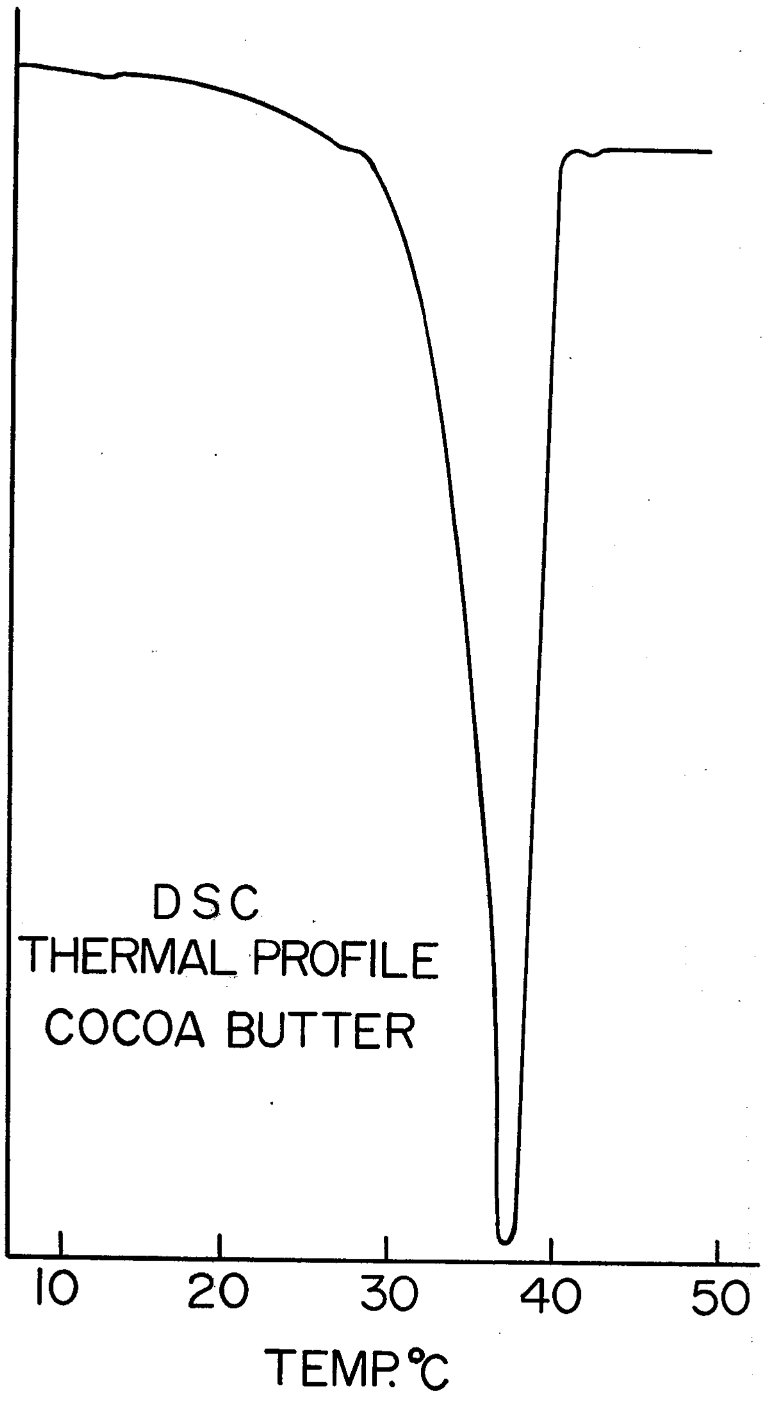
FIGS. 4 and 5 represent respectively the DSC thermal and GLC curves for cocoa butter.
Figure 5:
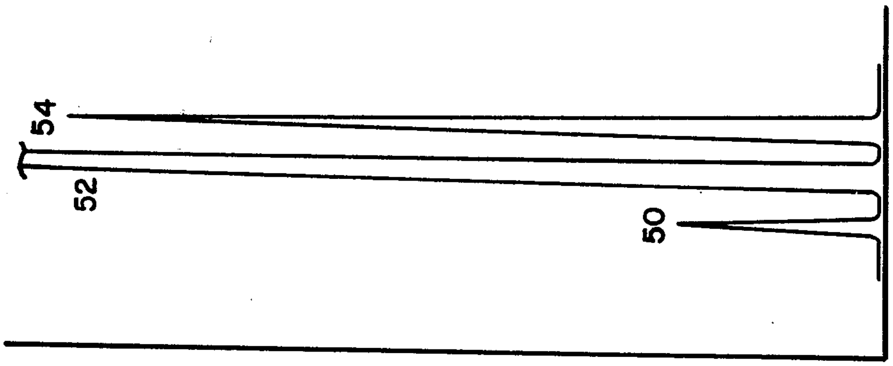

The thermal and GLC profiles of Fraction 3 are shown in FIGS. 3A and 3B. Fraction 3 is a semisolid or plastic solid having composition and properties very close to those of cocoa butter. The similarity of properties is seen by comparing the DSC thermal profile of Fraction 3 (FIG. 3A) with that of cocoa butter (FIG. 4). Both soften at about 20° C., start melting rapidly at about 30° C., and melt completely at about 37° C. The similarity of the fatty acid composition and component glycerides of Fraction 3 with those of cocoa butter is seen by comparing the GLC profile of Fraction 3 (FIG. 3B) with that of cocoa butter (FIG. 5). In both Fraction 3 and cocoa butter the major glycerides are disaturated monounsaturated with minor amounts of trisaturated and monunsaturated diunsaturated glycerides.

Figure 6B:
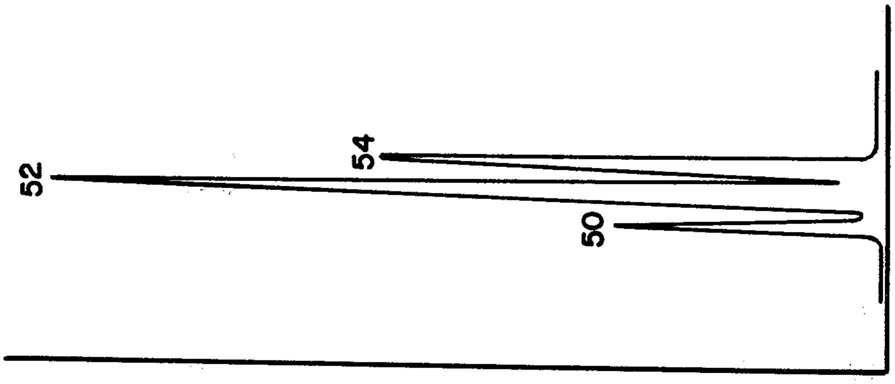
FIGS. 6A and 6B represent respectively the DSC thermal and GLC curves for a 50/50 mixture of cocoa butter and a fat fraction.
Figure 6A:
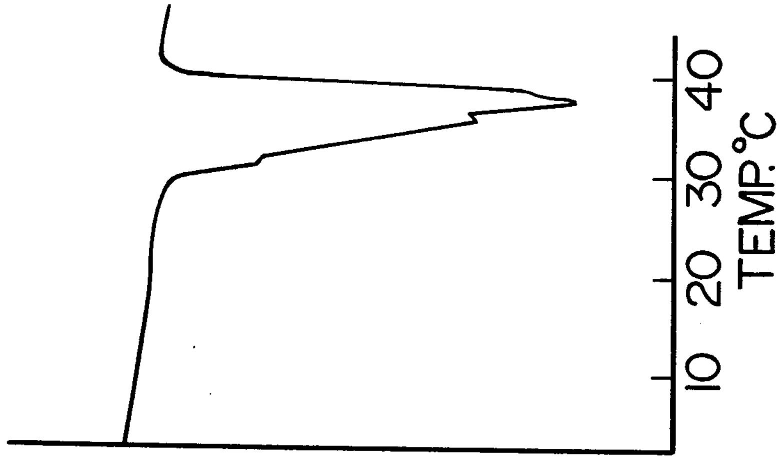

Fraction 3 which, as seen, is similar in thermal characteristics and glycerides to cocoa butter can thus be used as a confectionery fat or as a cocoa butter extender. It has excellent compatibility with cocoa butter and when mixed with cocoa butter produces little change in the thermal characteristics. This is shown by the comparison of the DSC thermal curves of pure cocoa butter (FIG. 4) and a 50/50 mixture of cocoa butter and Fraction 3 (FIG. 6A). Each begins melting at about 30° C. and is completely melted at about 37° C. The GLC curve of this mixture is seen in FIG. 6B.

Figure 8B:
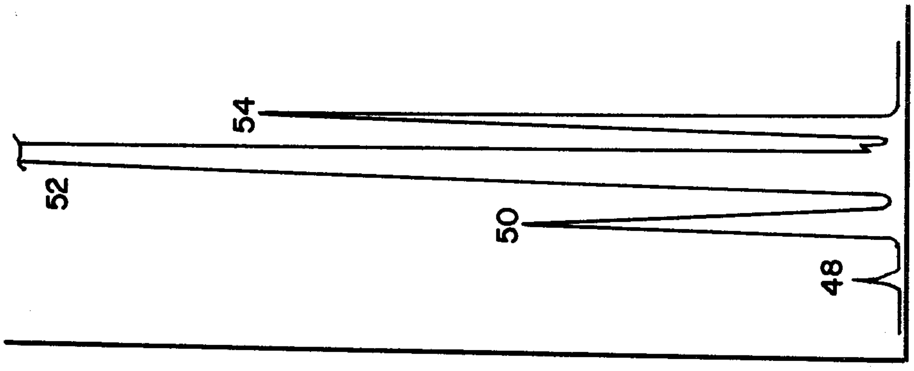
FIGS. 8A and 8B represent respectively the DSC thermal and GLC curves for another fat fraction.
Figure 7B:
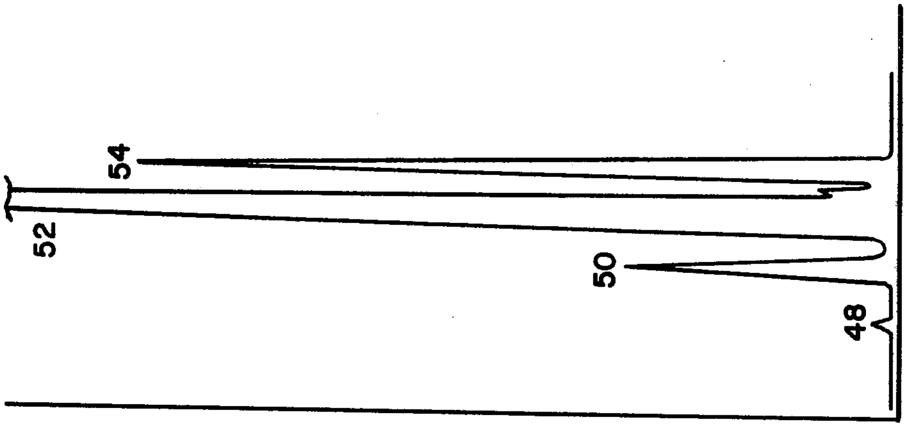
FIGS. 7A and 7B represent respectively the DSC thermal and GLC curves for a liquid fat fraction.
Figure 8A:
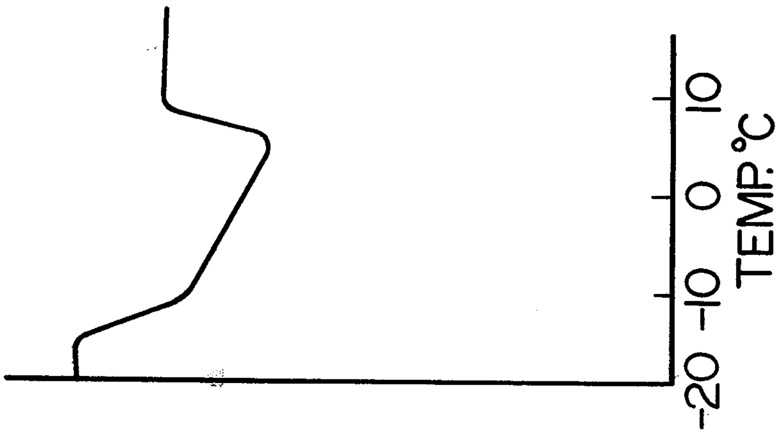
Figure 7A:
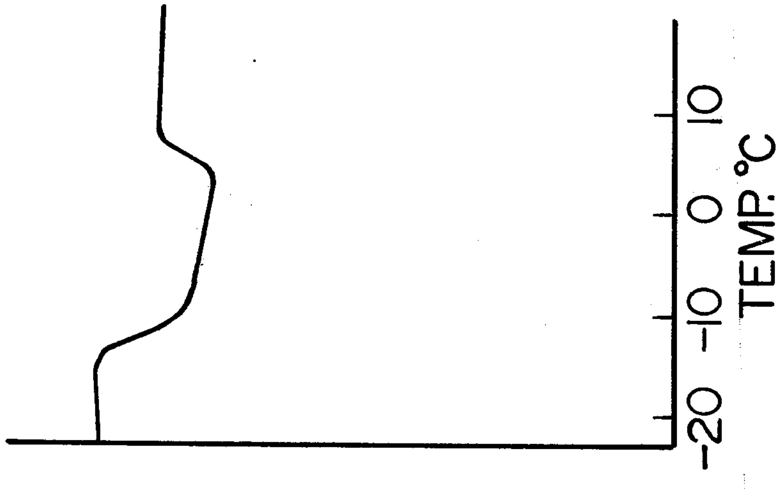

Fractions 4 and 5 comprise the liquid portion of beef tallow and contain mainly monosaturated, diunsaturated and triunsaturated glycerides. They are similar in properties and composition as seen by a comparison of their thermal and GLC profiles; Fraction 4, FIGS. 7A and 7B, respectively, and Fraction 5, FIGS. 8A and 8B, respectively. Fraction 4 has a slightly higher melting range than Fraction 5 and has utility similar to that of Fraction 2. As seen in FIGS. 7A and 7B. Fractions 4 and 5 are not completely solid at −15° C. The final melting of that portion of each fraction that is solid is shown in the profiles. In each case the solid portion is completely melted at about 5° C.

Fraction 5 is the major fraction and accounts for 60% of the tallow. As a liquid fat Fraction 5 has many uses. It is an ideal starting material for the manufacture of salad oil or it can be blended with Fractions 1 and 2 as starting material for margarine. Alone, it is also a good speciality shortening for use in the automated bread making industry. In the non-food category, it can be used as an excellent base for the manufacture of synthetic sperm oil, for the manufacture of foam plastics, and for making lotions, creams, and ointments in cosmetics and pharmaceuticals.

Figure 9:
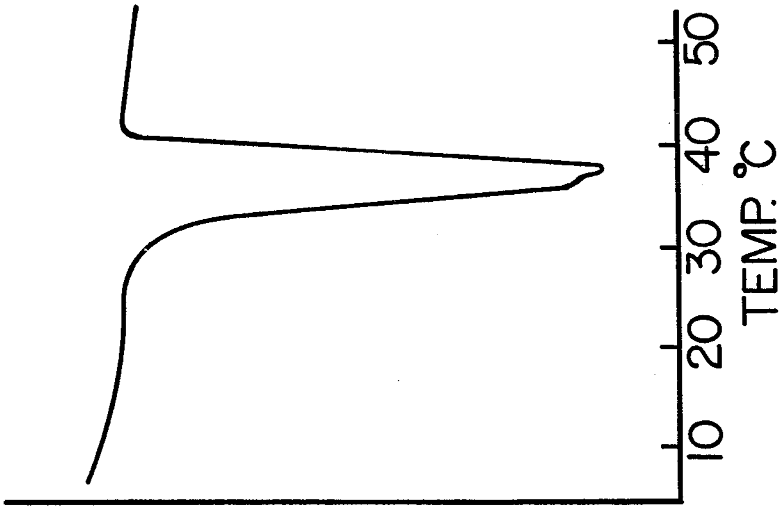
FIGS. 9 and 10 represent DSC thermal profiles for mixtures of cocoa butter with various fat fractions.

For some confectionery uses, either higher or lower temperature ranges than those exhibited by Fraction 3 of this invention or by natural cocoa butter may be desirable. Higher temperature range products are made by adding increments of Fraction 2 to Fraction 3. The resulting products are stable materials containing all the desirable characteristics of Fraction 3, in particular its compatibility with cocoa butter. These products of higher melting range contain only minor amounts of geometric and positional isomers of oleic acid unlike similar materials prepared from oils requiring hydrogenation. The compatibility of a modified Fraction 3, 80% Fraction 3 and 20% Fraction 2, with cocoa butter is shown in FIG. 9 by the DSC thermal profile of a 50/50 mixture of it and cocoa butter. This modified fraction begins to melt at about 29° C. and is completely melted at about 38° C.

Likewise, lower melting range products are made by adding increments of Fraction 4 to Fraction 3. These lower melting products are also compatible with cocoa butter and are desirable for the enrobing of ice cream and other similar uses.

Figure 10:
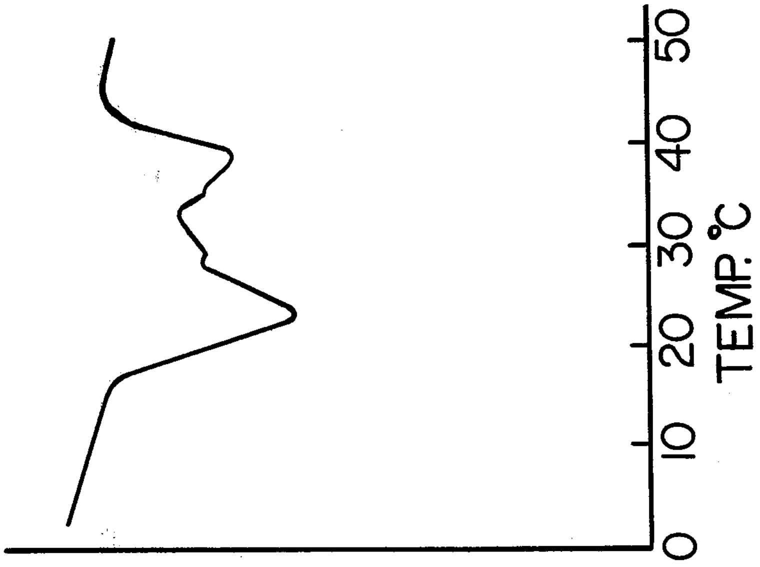

The ability to blend increments of Fraction 2 or 4 with Fraction 3 to make products that have a desired thermal range and that are compatible with cocoa butter exemplifies the uniqueness of this invention. Although Fractions 1 and 2 seem to be quite similar, the crystal nature of Fraction 1 is such that when added alone or with Fraction 2 to Fraction 3, it produces undesirable characteristics in the resulting product. This is demonstrated in FIG. 10 which shows a DSC thermal profile of a 50/50 mixture of cocoa butter and a product containing 80% Fraction 3 and 20% Fraction 1. The sample softens at about 10° C. and starts rapidly melting at about 18° C. Although the lower melting triglycerides melt at about 22° C. as evidenced by the peak, the higher melting triglycerides melt over a range of temperatures until the sample is completely melted at 39° C. The inclusion of the higher melting glycerides of Fraction 1 with the fraction resembling cocoa butter (Fraction 3) accentuates the "bloom problem" associated with chocolate confections. Consequently, for the purposes of this invention, it is imperative that the higher melting glycerides of tallow be removed in two successive crystallizations to yield two fractions.

For fatty food uses, the fractions all have high levels of acceptance colorwise, odorwise, and tastewise. For specialized uses requiring extremes of blandness or color, the fractions can be deoderized or decolorized by any of the accepted commercial procedures. Fractions 3, 4 and 5 are susceptible to oxidative rancidity but they can be oxidatively stabilized quite adequately by the addition of appropriate approved antioxidants. All the fractions are extremely stable to hydrolytic rancidity.

Although, at present, only those products made from edible tallow can be used for human consumption, the process of this invention can be applied to inedible as well as to edible tallow.

This invention is illustrated by the following examples:

EXAMPLE I 1000 grams of edible beef tallow similar in fatty acid composition to that previously described was added to 10 liters of acetone. The mixture was warmed to about 40° C. until all of the tallow was in solution. The solution was allowed to cool at 25° C., without stirring, for 16–20 hours. At this time, filtration was carried out under moderate vacuum using an ordinary Buchner funnel. The collected precipitate (Fraction 1) was washed once with 200 ml. of acetone previously cooled to the temperature of the crystallization. The yield of Fraction 1 was 75 grams. The filtrate solution was adjusted to a solvent ratio of 10 to 1 and the next crystallization step carried out at a temperature of 2° C. for a period of 16–18 hours. The precipitate was collected as before and the filtrate after removal of solvent was designated as Fraction 5, yield, 600 grams. The precipitate from 2° C. crystallization was redissolved in acetone at a solvent/sample ratio of 20 to 1 and the solution was allowed to crystallize for 16–18 hours at 15° C. without stirring. The precipitate from this crystallization was collected in the same manner and designated Fraction 2. The yield of Fraction 2 was 75 grams. The filtrate from this crystallization was adjusted to a 15 to 1 solvent/sample ratio and the solution was allowed to crystallize at 2° C. for a period of 16–18 hours. The collected precipitate from this crystallization was designated Fraction 3. The filtrate after removal of solvent was designated Fraction 4. The yield of Fraction 3 was 200 grams while the yield of Fraction 4 was 50 grams.

Following is the above fractionation in outline form:

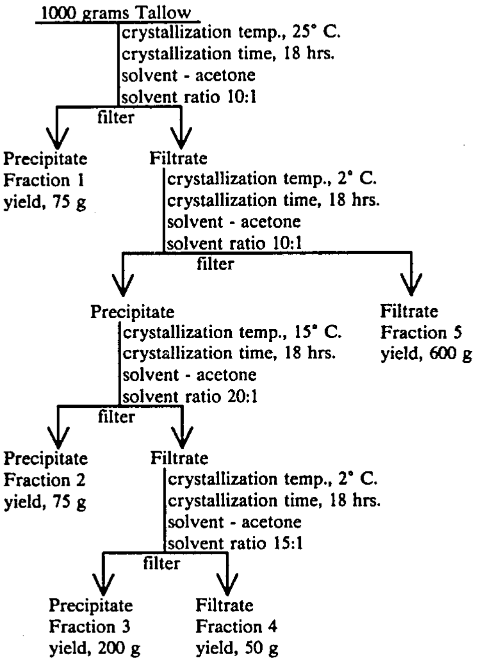

Utility of the tallow fractions isolated in Example 1 is illustrated in the next four examples. Since these fractions can be used in many other ways and formulations, the following illustrations are not intended to be limiting in any way.

EXAMPLE 2

Formulation of a Non-hydrogenated Shortening Fat

In the selective hydrogenation of oils for shortening bases, there is usually an increase of 20% or more of saturated acids over that present in the original oil. With the hydrogenation of the polyunsaturated fatty acids of the liquid oil to monounsaturated acid, there are produced large amounts of trans acids. These trans acids impart desirable plastic properties to the shortenings similar to that imparted by saturated acids. However, recently, in the lay press and in the scientific journals, the nutritional value of isomers resulting from the hydrogenation step has been questioned. Plastic shortenings not subjected to this criticism are formulated using a mixture of corn oil, or cottonseed oil or similar oils and from 35 to 50% of Fraction 1 of this invention or of a 50/50 combination of Fractions 1 and 2 according to the desired consistency of the final product. When the liquid oil in the formulation is one of the oils high in linoleic acid content and low in linolenic acid, a shortening is produced with desirable nutritional and keeping qualities. The low content of linolenic acid reduces the tendency of the shortening to revet in flavor, yet the content of the essential linoleic acid is high. Also, with the addition of solid glycerides of this invention, the concentration of trans acids in the product is low.

EXAMPLE 3

Preparation of a Margarine Base Stock

Fraction 1 of this invention and to a lesser extent Fraction 2 of this invention are excellent sources of solid triglycerides. One of the common techniques for improving the consistency of liquid oil margarine bases (safflower oil or corn oil) is the addition of solid triglycerides to the liquid oil. These solid triglycerides or "hardstocks" are usually produced by hydrogenating other liquid oils (cottonseed or soybean oil) to a low iodine number. Fractions 1 and 2 of this invention are a ready source of solid triglycerides and are used to produce margarines by blending 5 to 40% of either of these fractions or a 50/50 mixture of both with an appropriate liquid oil such as safflower or corn oil. The addition of only 5 to 15% by weight of the solid glycerides to the base margarine oil produces the so-called "soft margarines". Higher concentrations of the solid glyceride fractions, 20 to 35% by weight produces the normal plastic margarines. the margarines produced from the above mixtures also contain other material such as milk solids, mono or diglycerides, lecithin, water and accepted flavor and coloring ingredients. The use of the solid glyceride fractions of this invention eliminates the necessity of selectively hydrogenating oil stocks for the production of solid triglycerides. Another advantage of this invention is that the solid triglycerides produced by this invention have only minor amounts of the trans acids about which, as previously stated, there is a question of nutritional value. Both the "soft" margarines and the "normal" margarines are also made from fat blends of the tallow fractions and the edible oil that have been catalytically rearranged by esterification.

EXAMPLE 4

Formulation of a Confectionery Fat

Fraction 3 of this invention is a unique material whose thermal properties and composition have been described. This fraction is very similar in triglyceride composition and thermal properties to cocoa butter. Because of this, it can be used in many confections to repalce cocoa butter or it can be used with cocoa butter over a wide range or proportions without undesirable thermal effects such as formation of eutectic mixtures and consequent lowering of the melting characteristics. Fraction 3 is a basic material for confectionery uses, in that its melting range is effectively raised or lowered by the addition of increments of either Fraction 2 or of Fraction 4. Thus, with our invention it is possible to produce a confectionery fat suitable for all types of confectionery coatings. The addition of 5 to 20% of Fraction 4 to the basic Fraction 3 produces a fatty material of lower melting range that is useful in chocolate type coatings such as whip toppings or ice cream coatings.

The addition of 5 to 20% of Fraction 2 to Fraction 3 produces a confectionery fat of higher melting range than cocoa butter yet suitable for many confectionery coatings and centers as well as coatings for cookies and biscuits and other bakery products.

EXAMPLE 5

Formulations of Salad Oils, Margarines, Liquid Shortenings, and Plastic Shortenings from Fraction 5

A wide variety of oils can normally be used for salad oils. The natural salad oils such as olive oil, sunflower oil and safflower oil do not form solids when stored at the usual refrigerator temperatures of 45° F. Other oils must be given a preliminary winterizing whereby higher melting solid triglycerides are removed from the oils. The liquid oil of this invention, Fraction 5, does not require winterizing to remain liquid at 45° F. However, if it is required that the oil be liquid after long term storage at colder temperatures, such as 40° F., a crystallization inhibitor is added. Fraction 5 is compatible with any of the approved inhibitors and it can be winterized by standard winterization processes or by additional solvent crystallization to remove about 2 to 5% of the higher melting disaturated monounsaturated glycerides.

Fraction 5 can be modified by any mild rearrangement process using sodium methoxide or similar catalyst. Complete rearrangement of Fraction 5 gives a maximum distribution of the saturated fatty acids producing a decrease in the disaturated monounsaturated glycerides and a corresponding increase in the monosaturated diunsaturated glycerides. This change in glyceride composition of Fraction 5 produces a lowering of the melting range and the rearranged fraction will stay liquid at temperatures substantially lower than the 40° F.

Table T

| Fraction | Yield % | Nature of Fraction | Major Glyceride Type |
|---|---|---|---|
| 1 | 7.5 | Solid (crystalline) | trisaturated - #1 |
| 2 | 7.5 | Solid (crystalline) | trisaturated - #1 |
| 3 | 20.0 | Solid (plastic) | disaturated - #2, #3 |
| 4 | 5.0 | Liquid | monosaturated- #4, #5 triunsaturated #6 |
| 5 | 60.0 | Liquid | monosaturated- #4, #5 triunsaturated #6 |

Table II

| Acid | | Fraction 1 % | 2 % | 3 % | 4 % | 5 % |
|---|---|---|---|---|---|---|
| tetradecanoic | 14:0 | 4.0 | 6.0 | 3.0 | 4.0 | 3.0 |
| hexadecanoic | 16:0 | 37.0 | 36.0 | 32.0 | 24.0 | 21.0 |
| hexadecenoic | 16:1 | 1.0 | 1.0 | 2.0 | 5.0 | 5.0 |
| octadecanoic | 18:0 | 41.0 | 34.0 | 28.0 | 11.0 | 8.0 |
| octadecenoic | 18:1 | 16.0 | 21.0 | 33.0 | 52.0 | 58.0 |
| others | | 1.0 | 2.0 | 2.0 | 4.0 | 5.0 |

Table III

| Carbon Number | Fraction 1 % | 2 % | 3 % | 4 % | 5 % |
|---|---|---|---|---|---|
| 48 | 12 | 15 | tr | 4 | 5 |
| 50 | 31 | 28 | 30 | 18 | 22 |
| 52 | 39 | 36 | 49 | 45 | 44 |
| 54 | 18 | 21 | 21 | 33 | 29 |

We claim:

1. A liquid tallow fraction useful as a component in shortenings and margarines and for combining with other tallow fractions to make specialty fats consisting essentially of monosaturated, triunsaturated glycerides having a gas-liquid chromatographic profile indicating a composition having 4%, 18%, 45% and 33% of glycerides having carbon numbers of 48, 50, 52 and 54, respectively, and a thermal profile indicating that it it not completely solid at −15° C. and that the portion that does solidify at −15° C. melts at about 5° C.

* * * * *